US011892164B2

(12) United States Patent
Stanley et al.

(10) Patent No.: US 11,892,164 B2
(45) Date of Patent: *Feb. 6, 2024

(54) VIEWPORT FOR HIGH TEMPERATURE COMBUSTION ZONES

(71) Applicant: HRST, Inc., Eden Prairie, MN (US)

(72) Inventors: Lester Stanley, Minnetonka, MN (US); Darryl Nagel, Hudson, WI (US); Robert Tretter, Brooklyn Park, MN (US); Joshua Himes, Alexandria, VA (US); Matthew Adams, Columbus, OH (US); Lauri Reponen, Columbus, OH (US); Thomas George, Pickerington, OH (US); Russell Marzette, Columbus, OH (US)

(73) Assignee: HRST, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,944

(22) Filed: Mar. 10, 2023

(65) Prior Publication Data

US 2023/0213189 A1 Jul. 6, 2023

Related U.S. Application Data

(63) Continuation of application No. 16/814,433, filed on Mar. 10, 2020, now Pat. No. 11,603,992.

(51) Int. Cl.

*F23M 11/04* (2006.01)
*F24C 15/00* (2006.01)
(Continued)

(52) U.S. Cl.

CPC ............. *F23M 11/042* (2013.01); *F23M 7/02* (2013.01); *F23M 11/04* (2013.01); *F23M 11/045* (2013.01);
(Continued)

(58) Field of Classification Search

CPC ........ F23M 7/02; F23M 11/04; F23M 11/042; F23M 11/045; F23M 2900/05004; F24C 15/004; F27D 21/02
(Continued)

(56) References Cited

U.S. PATENT DOCUMENTS 1,604,811 A * 10/1926 Curry ........................ F23M 7/00 126/200
1,717,636 A * 6/1929 Vastine ................ F23M 11/042 126/200
(Continued)

FOREIGN PATENT DOCUMENTS

DE 202005016163 U1 2/2006
DE 202005016163 U1 * 3/2006 ............ F24B 13/002
(Continued)

OTHER PUBLICATIONS

DE-202005016163-U1—Translation (Year: 2006).*
KR-2005019281-A—Translation (Year: 2005).*

*Primary Examiner* — Steven B McAllister
*Assistant Examiner* — Benjamin W Johnson
(74) *Attorney, Agent, or Firm* — Edwin E. Voigt, II

(57) ABSTRACT

A viewport for a combustion zone includes an inner casing having a flange extending into the combustion zone. A first layer of ceramic fiber insulation is exterior to the inner casing. A middle casing includes two panes of quartz glass separated by traverse plates. A second layer of ceramic fiber insulation is exterior to the middle casing. An outer casing is positioned to the exterior of the second layer of insulation. The middle casing includes L-shaped ledges having third and fourth layers of ceramic insulation. The panes of glass are each positioned between layers of insulation and the insulation positioned in the L-shaped ledges. The viewport is modular enabling the separation of the first layer of insulation, the middle casing, the second layer of insulation
(Continued)

and the outer casing from the combustion zone for maintenance or repair. The viewport minimizes heat migration to the outer casing during use.

24 Claims, 3 Drawing Sheets

(51) Int. Cl.
*F27D 21/02* (2006.01)
*F23M 7/02* (2006.01)

(52) U.S. Cl.
CPC .. *F23M 2900/05004* (2013.01); *F24C 15/004* (2013.01); *F27D 21/02* (2013.01)

(58) Field of Classification Search
USPC ........................................................ 431/13
See application file for complete search history.

(56) References Cited

U.S. PATENT DOCUMENTS

| | | | | |
|---|---|---|---|---|
| 1,717,637 A * | 6/1929 | Vastine | F23M 11/042 | 236/15 R |
| 2,704,999 A * | 3/1955 | Schoessow | F23M 11/042 | 122/499 |
| 6,439,171 B1 * | 8/2002 | McCall | F23M 11/042 | 122/494 |

FOREIGN PATENT DOCUMENTS

| | | | |
|---|---|---|---|
| KR | 2005019281 A | * | 3/2005 |
| KR | 20050019281 A | | 3/2005 |

* cited by examiner

VIEWPORT FOR HIGH TEMPERATURE COMBUSTION ZONES

CROSS-REFERENCE TO RELATED APPLICATION

This application is a continuation application from U.S. patent application Ser. No. 16/814,433 filed Mar. 10, 2020, issued as U.S. Pat. No. 11,603,992 on Mar. 14, 2023, which is incorporated herein by reference in its entirety.

FIELD OF THE INVENTION

The invention relates to a viewport for a HRSG including duct burner elements, a viewport for a heat treating furnace burning natural gas, a viewport for a thermal oxidizer section in an Ethanol plant, a viewport for a high temperature combustion zone of a package boiler burning natural gas, or other high temperature combustion zones, the viewport using a layered system of window panes, and insulating gaskets, to create thermal breaks. The thermal breaks reduce heat transfer through the burner flame viewport, while providing observation of the flames and burners during operation of the combustion zone.

BACKGROUND

In one example, Heat Recovery Steam Generators (HRSGs) are used within a process which generates a significant amount of waste heat at high temperatures, which in turn is suitable for steam power generation. A common form of an HRSG may be found in a dual-cycle power plant, including a gas turbine, which is used to generate power. The exhaust gases exiting the turbine are fed into a steam generator where the heat is used to generate steam to create additional electric power.

In order to provide flexibility in power generation and increased power, many HRSGs are equipped with additional duct burner elements. The additional duct burner elements provide for increased power output, more rapid startup cycles to satisfy the demands of a variable power grid, and more flexibility in operation.

The inclusion of additional duct burner elements increases the complexity and requirements upon a HRSG to ensure the safety of the operators and bystanders, especially with plants having aging burners, or plants which are operating beyond their initially intended capacity.

In order to monitor burner safety and operational performance of the duct burner elements, the National Fire Protection Association (NFPA) requires the burners to be equipped with one or more visual inspection windows which allow operators to visually inspect and monitor a burner flame pattern, check for potential degradation of burner elements, inspect for burner sag and creep, or otherwise to monitor a host of other potential hazards to the safety to individuals or to the integrity of the combustion zone.

The known viewport window designs, both in OEM and from aftermarket manufacturers, include several operational shortcomings which are not necessarily limited to thermally unsafe external surfaces, corrosion, containment failure, glass failure, small viewing areas, as well as difficulty of installation, maintenance, and replacement.

In addition, known viewport designs use a single window pane and internal sliding (or hinged) shielding plates to provide observation of the operational status of a burner. The use of shielding plates requires manipulation of a lever or actuator which may be unsafe to touch without burn protection due to thermal transfer. In addition, the known viewport designs frequently add cooling air ports to attempt to reduce the temperature of the viewport and to minimize risk of injury to individuals. The know viewport designs also have a relatively short product life cycle due to corrosion.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entireties.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

The viewport for a combustion zone, which in one example may be found in a HRSG having duct burner elements, permits continuous viewing of the burner elements without the manipulation or maintenance of a lever or an actuator, or to otherwise maintain a lever, actuator or other moving parts. The viewport for the combustion zone permit the windows and the inner assembly of the viewport to be proximate to a combustion zone enclosure wall, and to operate and provide safe observation of the burner elements, when the temperature of the outer casing of the viewport is sufficiently cool to reduce or minimize risk of a burning hazard to individuals.

The viewport in one embodiment includes thermal breaks and two window panes separated from each other eliminating the need for circulation of cooling air through the viewport.

In at least one embodiment, the viewport includes two areas of glass and ceramic fiber to create thermal breaks within the viewport so that the high temperatures inside the combustion zones have significantly lower heat conduction to the outside portion of the viewport, which is exposed to individuals. The viewport does not include internal sliding (or hinged) heat shielding plates which are required to be manipulated to provide observation of the burner elements. Eliminating the heat shielding plates allows for continuous viewing of the burner elements without the need to touch the housing or to maintain moving parts.

In one alternative embodiment, the inner casing assembly of the viewport is adjacent to a combustion zone enclosure wall. The middle casing assembly, having the interior and exterior windows of the viewport, is positioned outwardly relative to the exterior wall of the combustion zone. The outer casing and middle casing assembly have a temperature during use which is sufficiently cool to eliminate or significantly reduce the risk of a burning hazard to an individual. The insulation properties and window pane design of the viewport eliminates the necessity for circulation of cooling air within the viewport.

In at least one embodiment, the metallic components of the viewport are formed of 310 stainless steel. At least one of the panes of glass are formed of quartz glass or other types of high temperature glass, and the insulation is formed of ceramic fiber. The two panes of quartz glass provide extra safety, and are more durable than other types of glass alternatives.

In one embodiment, the viewport includes an inner casing and a middle casing. The inner casing includes a flange. The flange extends through an opening through the combustion zone exterior wall enabling the inner casing to be welded to the exterior wall of the combustion zone, without causing any damage or deformation to the middle casing or to the exterior wall of the combustion zone.

In another alternative, embodiment ceramic fiber is used as insulation to create thermal seals and a thermal break between the different assemblies of the viewport.

In yet another alternative embodiment, optional air intake and air exhaust ports may be provided in the viewport to receive circulated cooling air to minimize condensation.

In one embodiment, the viewport is designed for installation to an exterior wall of a combustion zone from the outside only, which improves safety to individuals. The viewport further includes an enlarged viewing area and a longer product life cycle, improving utility and reducing overall viewport expense. The viewport also does not include any moving parts, has reduced fatigue concerns, and is less susceptible to corrosion. The viewport additionally improves convenience for plant inspectors who may simply look through the viewport without having to operate any mechanical shutter mechanism.

In one embodiment, the viewing area for the viewport has been increased from a size of 4"×6" to 6"×9".

In one embodiment, the temperature of the exterior casing and the middle casing assembly is reduced as a result of the use of a double glass pane design and layers of ceramic fiber insulation.

In one embodiment, ease of installation is improved by the welding of the inner casing onto the exterior wall of the combustion zone proximate to a window opening through the combustion zone exterior wall, as opposed to the attachment of the viewport to the combustion zone through the use of mechanical bolt fasteners. The use of mechanical bolt fasteners would require precise drilling and installation efforts.

In one embodiment, a viewport includes an inner casing assembly having an inner plate, an inner casing window opening disposed centrally relative to the inner plate, the inner plate being attached to an exterior surface of a wall of the combustion zone, the inner casing assembly having a flange extending from the inner plate into said interior of the combustion zone; a first layer of insulation formed of ceramic fiber is positioned adjacent to the inner plate exterior to the combustion zone, the first layer of insulation has a first layer window opening, the first layer window opening being aligned relative to the inner plate; a middle casing assembly, the middle casing assembly being positioned adjacent and exterior to the first layer of insulation, the middle casing assembly comprising a first middle plate having a first middle casing window opening, a plurality of traverse plates extending outwardly and normally from the first middle plate proximate to the first middle casing window opening, and second middle plate having a second middle window opening, the second middle plate being integral with the plurality of traverse plates proximate to the first middle casing window opening; a first or inner insulated pane of glass formed of Quartz is disposed between the first middle plate and the first layer of insulation, the first or inner insulated pane of glass being larger than and covering the first middle casing window opening and the first layer window opening; a second layer of insulation formed of ceramic fiber is positioned adjacent and exterior of the second middle plate, the second layer of insulation having a second layer window opening, the second layer window opening being aligned relative to the second middle window opening; a second or outer insulated pane of glass formed of Quartz or other high temperature glass is disposed between the second middle plate and the second layer of insulation, the second or outer insulated pane of glass being larger than and covering the second middle window opening and the second layer window opening; and an outer casing assembly, the outer casing assembly having an outer casing window opening, the outer casing window opening, being aligned relative to the second layer window opening, wherein first fasteners extend outwardly from the interior of the combustion zone, the first fasteners engaging the inner plate, the first layer of insulation and the first middle plate, wherein tightening the first fasteners squeezes the first or inner insulated pane of glass between the middle casing assembly and the inner plate, and further wherein second fasteners extend inwardly from the outer casing assembly, the second fasteners engaging the outer casing assembly, the second layer of insulation and the second middle plate, wherein tightening of the second fasteners squeezes the second or outer insulated pane of glass between the second layer of insulation and the second middle plate and further wherein the first fasteners may be released and the first layer of insulation, the middle casing assembly, the first or inner insulated pane of glass, the second or outer insulated pane of glass, the second layer of insulation and the outer casing assembly may be separated from the combustion zone.

In another embodiment, the viewport includes a middle casing assembly having a middle top traverse plate, a middle bottom traverse plate, a middle left traverse plate and a middle right traverse plate. The viewport further includes a first middle plate having a first plate top wall, a first plate bottom wall, a first plate left wall and a first plate right wall, where the first plate top wall extends perpendicularly upward from the outside of the middle top traverse plate, the first plate bottom wall extends perpendicularly downward from the outside of the middle bottom traverse plate, the first plate left wall extends perpendicularly outward from the outside of the middle left traverse plate, and the first plate right wall extends perpendicularly outward from the outside of the middle right traverse plate.

In another embodiment, the viewport includes the second middle plate having a second plate top wall, a second plate bottom wall, a second plate left wall and a second plate right wall, the second plate top wall extending perpendicularly upward from the outside of the middle top traverse plate, the second plate bottom wall extending perpendicularly downward from the outside of the middle bottom traverse plate, the second plate left wall extending perpendicularly outward from the outside of the middle left traverse plate and the second plate right wall extending perpendicularly outward from the outside of the middle right traverse plate.

In another embodiment, the viewport includes a middle top traverse plate having a top first middle positioning flange and a top second middle positioning flange, the top first middle positioning flange and the top second middle positioning flange being separated and parallel relative to each other, the top first middle positioning flange and the top second middle positioning flange being perpendicular to and extending inwardly from the inside of the middle top traverse plate.

In another embodiment, the viewport includes a middle bottom traverse plate having a bottom first middle positioning flange and a bottom second middle positioning flange, the bottom first middle positioning flange and the bottom second middle positioning flange being separated and parallel relative to each other, the top first middle positioning flange and the bottom second middle positioning flange being perpendicular and extending inwardly from the inside of the middle bottom traverse plate.

In another embodiment, the viewport includes a middle left traverse plate having a left first middle positioning flange and a left second middle positioning flange, the left first middle positioning flange and the left second middle positioning flange being separated and parallel relative to each other, the left first middle positioning flange and the left second middle positioning flange being perpendicular to and extending inwardly from the inside of the middle left traverse plate.

In another embodiment, the viewport includes a middle right traverse plate having a right first middle positioning flange and a right second middle positioning flange, the right first middle positioning flange and the right second middle positioning flange being separated and parallel relative to each other, the right first middle positioning flange and the right second middle positioning flange being perpendicular to and extending inwardly from the inside of the middle right traverse plate.

In another embodiment, the viewport includes a top first middle positioning flange which is offset rearwardly relative to the first plate top wall and a third layer of insulation is disposed adjacent to the inside of the middle top traverse plate and exterior to the top first middle positioning flange. The upper edge of the first or inner insulated pane of glass is in contact with the third layer of insulation disposed adjacent to the inside of the middle top traverse plate and exterior to the top first middle positioning flange.

In another embodiment, the viewport includes a bottom first middle positioning flange which is offset rearwardly relative to the first plate bottom wall and the third layer of insulation is disposed adjacent to the inside of the middle bottom traverse plate and exterior to the bottom first middle positioning flange. A lower edge of the first or inner insulated pane of glass is in contact with the third layer of insulation disposed adjacent to the inside of the middle bottom traverse plate and exterior to the bottom first middle positioning flange.

In another embodiment, the viewport includes a left first middle positioning flange which is offset rearwardly relative to the first plate left wall and the third layer of insulation is disposed adjacent to the inside of the middle left traverse plate and exterior to the left first middle positioning flange. A left edge of the first or inner insulated pane of glass is in contact with the third layer of insulation disposed adjacent to the inside of the middle left traverse plate and exterior to the left first middle positioning flange.

In another embodiment, the viewport includes a right first middle positioning flange which is offset rearwardly relative to the first plate right wall and the third layer of insulation is disposed adjacent to the inside of the middle right traverse plate and exterior to the right first middle positioning flange. A right edge of the first or inner insulated pane of glass is in contact with the third layer of insulation disposed adjacent to the inside of the middle right traverse plate and exterior to the right first middle positioning flange.

In another embodiment, the viewport includes a top second middle positioning flange which is offset forwardly relative to the second plate top wall and a fourth layer of insulation is disposed adjacent to the inside of the middle top traverse plate and exterior to the top second middle positioning flange. An upper edge of the second or outer insulated pane of glass is in contact with the fourth layer of insulation disposed adjacent to the inside of the middle top traverse plate and exterior to the top second middle positioning flange.

In another embodiment, the viewport includes a bottom second middle positioning flange which is offset forwardly relative to the second plate bottom wall, and the fourth layer of insulation is disposed adjacent to the inside of the middle bottom traverse plate and exterior to the bottom second middle positioning flange. A lower edge of the second or outer insulated pane of glass is in contact with the fourth layer of insulation disposed adjacent to the inside of the middle bottom traverse plate and exterior to the bottom second middle positioning flange.

In another embodiment, the viewport includes a left second middle positioning flange which is offset forwardly relative to the second plate left wall and further wherein the fourth layer of insulation is disposed adjacent to the inside of the middle left traverse plate and exterior to the left second middle positioning flange. A left edge of the second or outer insulated pane of glass is in contact with the fourth layer of insulation disposed adjacent to the inside of the middle left traverse plate and exterior to the left second middle positioning flange.

In another embodiment, the viewport includes a right second middle positioning flange which is offset forwardly relative to the second plate right wall and the fourth layer of insulation is disposed adjacent to the inside of the middle right traverse plate and exterior to the right second middle positioning flange. A right edge of the second or outer insulated pane of glass is in contact with the fourth layer of insulation disposed adjacent to the inside of the middle right traverse plate and exterior to the right second middle positioning flange.

These and other embodiments which characterize the invention are pointed out with particularity in the claims annexed hereto and forming a part hereof However, for a better understanding of the invention, its advantages and objectives obtained by its use, reference should be made to the drawings which form a further part hereof and the accompanying descriptive matter, in which there is illustrated and described a embodiments of the invention.

DETAILED DESCRIPTION OF THE PREFERRED EMBODIMENTS

Figure 1:
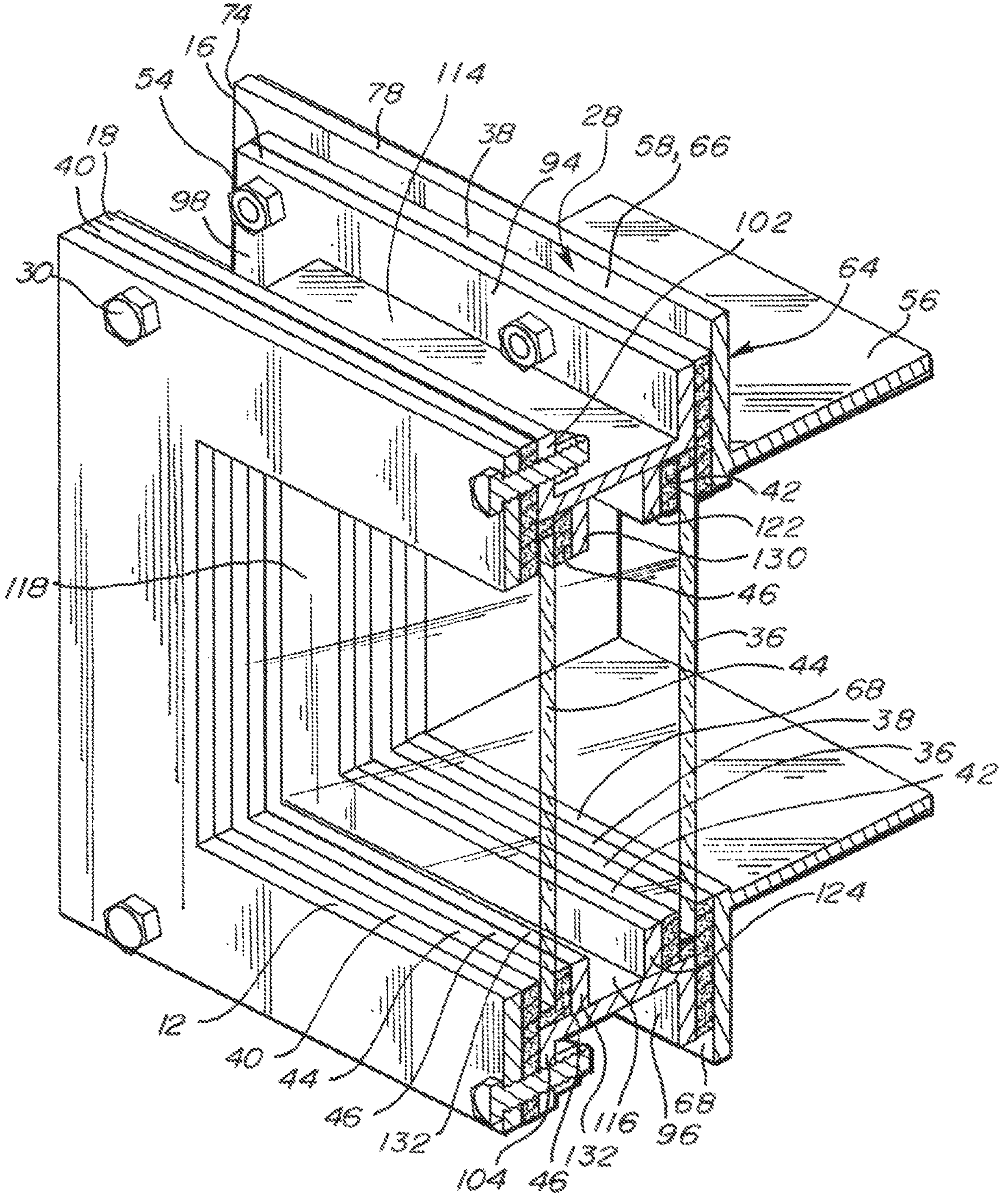
FIG. 1 is a cross-sectional perspective view of the viewport for a combustion zone elements taken along the line 1-1 of FIG. 3.
Figure 2:
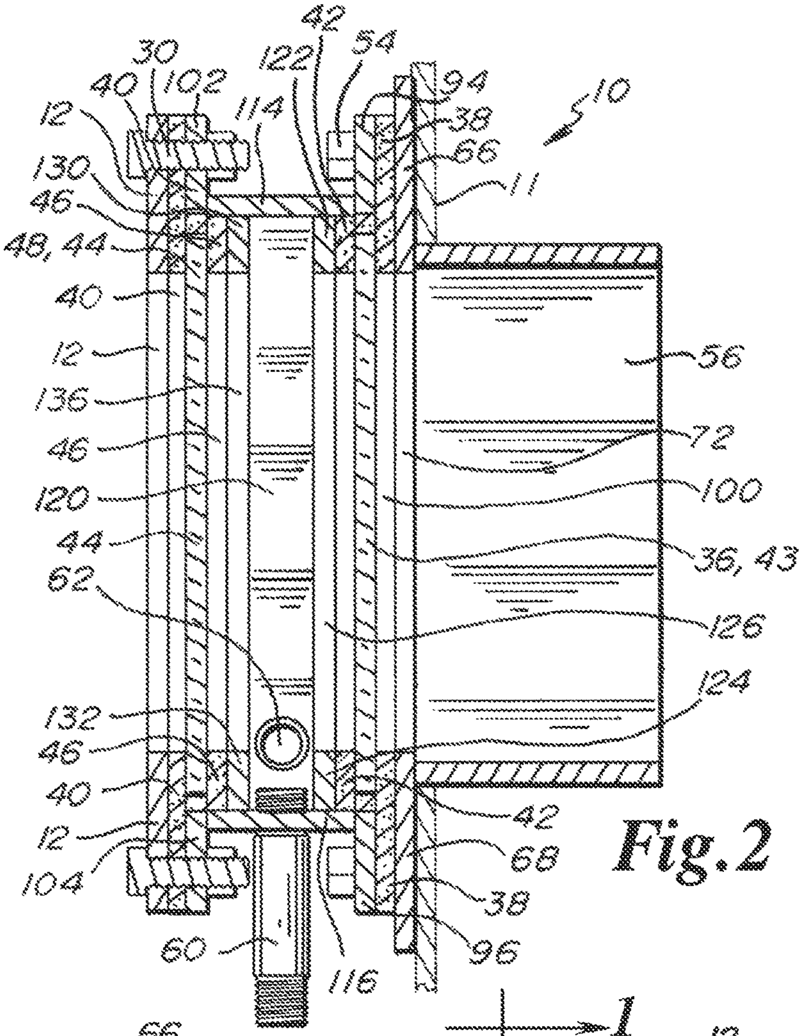
FIG. 2 is a cross-sectional side elevation view of the viewport for a combustion zone taken along the line 1-1 of FIG. 3.
Figure 3:
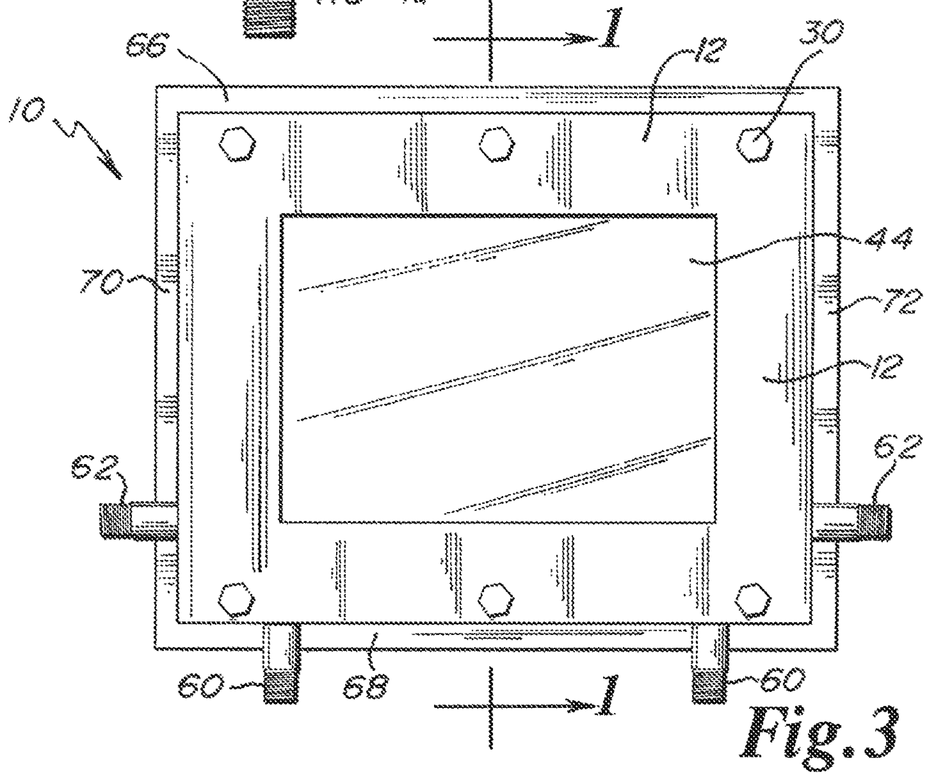
FIG. 3 is a front elevation view of the viewport for a combustion zone.
Figure 4:
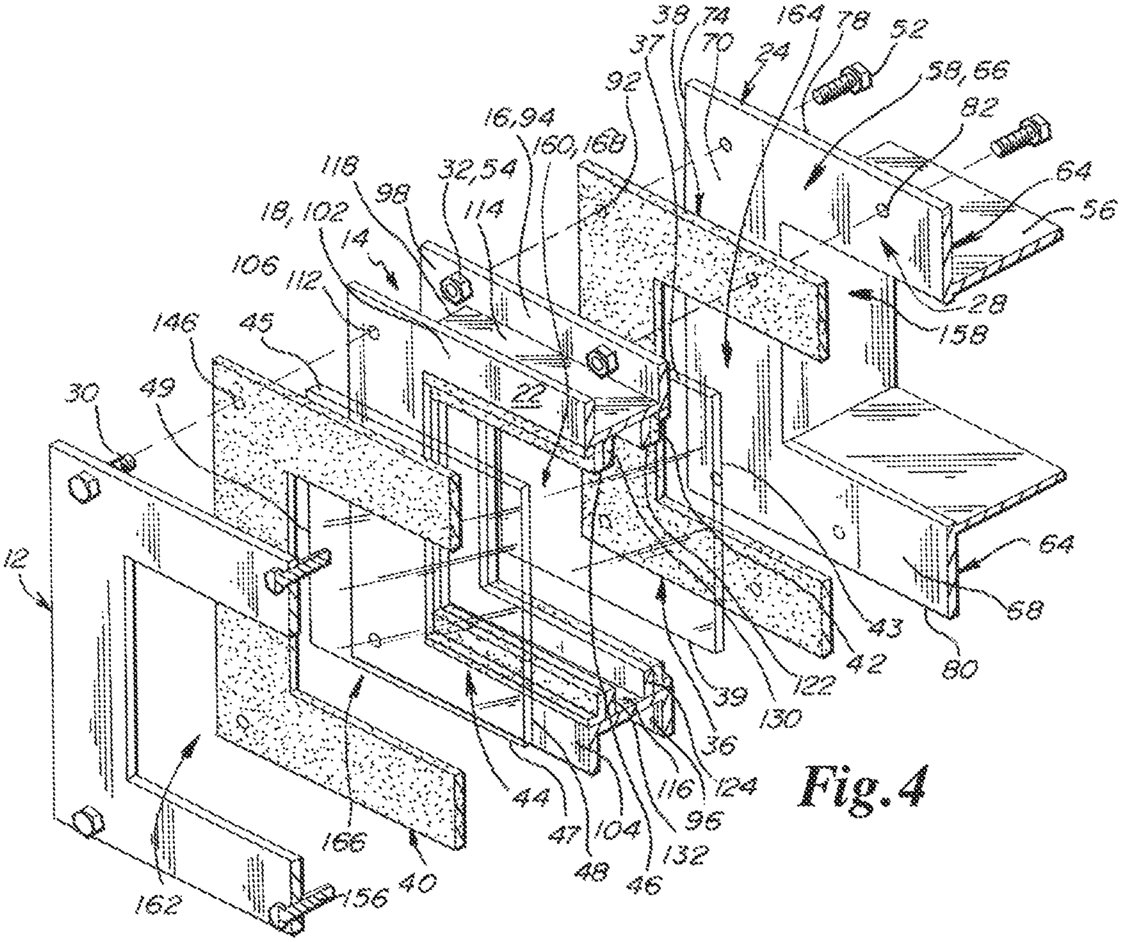
FIG. 4 is an exploded cross-sectional perspective view of the viewport for a combustion zone taken along the line 1-1 of FIG. 3.

As may be seen in FIG. 4, and in FIGS. 1 through 3, the viewport for a combustion zone is identified by reference numeral 10. In at least one embodiment, the viewport 10 is formed of an inner casing assembly 24, a middle casing assembly 14, and an outer casing assembly 12, which position a first or inner insulated pane of glass 36 and a second or outer insulated pane of glass 44 to permit viewing into the interior of the combustion zone to observe the burner elements.

The inner casing assembly 24 is positioned adjacent to, and is in contact with, the exterior wall 11 of the combustion zone. The inner casing assembly 24 includes a top inner casing wall 66, a bottom inner casing wall 68, a left inner casing wall 70, and a right inner casing wall 72. A flange 56 is integral with the top inner casing wall 66, bottom inner casing wall 68, left inner casing wall 70 and right inner casing wall 72 extending perpendicularly inward therefrom. The flange 56 is disposed around an inner casing window opening 158. The flange 56 is preferably rectangular in shape and has a sufficient width or depth dimension to extend into the interior of the combustion zone. The flange 56 has a depth dimension of not less than 3 inches. The flange 56 in at least one embodiment preferably acts as a shield to prevent contact between flame and the first or inner insulated pane of glass 36.

In at least one embodiment, the top inner casing wall 66 includes a top inner casing edge 78, the bottom inner casing wall 68 includes a bottom inner casing edge 80, the left inner casing wall 70 includes a left inner casing edge 74, and the right inner casing wall 72 includes a right inner casing edge 76. In addition, the top inner casing wall 66 and the bottom inner casing wall 68 each include a plurality of inner casing apertures 82. The inner casing apertures 82 each receive bolt a 52 during the assembly of the viewport 10. In at least one embodiment, the top inner casing edge 78, bottom inner casing edge 80, left inner casing edge 74, and right inner casing edge 76 are welded to the exterior wall 11 of the combustion zone.

In at least one embodiment the flange 56 may be integral to the top inner casing wall 66, bottom inner casing wall 68, left inner casing wall 70, and right inner casing wall 72 and may be formed by bending or stamping. In another embodiment, the flange 56 may be welded to the top inner casing wall 66, bottom inner casing wall 68, left inner casing wall 70 and right inner casing wall 72.

Each of the top inner casing wall 66, bottom inner casing wall 68, left inner casing wall 70 and right inner casing wall 72 include an interior surface 64. The interior surface 64 may be in contact with the exterior wall 11 of the combustion zone, without causing any damage or deformation to the combustion zone.

A first layer of insulation 38, second layer of insulation 40, third layer of insulation 42 and fourth layer of insulation 46 are used in the viewport 10 to create heat seals and function as thermal breaks between the inner casing assembly 24, middle casing assembly 14, and outer casing assembly 12. The optional air intake port 60 and air exhaust port 62 may be added to the viewport 10 so that air may be circulated within the viewport 10 to minimize condensation.

In a preferred embodiment, the viewport 10 is affixed/welded to the exterior wall 11 of the combustion zone through an exterior only installation process, where individuals do not enter into the interior of the combustion zone. The exterior only installation process improves the safety to the installers of the viewport 10.

In some embodiments, the temperature internally within an operating combustion zone, proximate to the flange 56, may become exposed to temperatures which may reach or exceed 1750° F. During use the temperature proximate to the outer casing assembly 12 is significantly reduced, and in optimal conditions may be below 225° F. and may be as cool as 140° F. The viewport 10 is used to provide observation of the flame ignition, flame color, flame pattern, flame length and the condition of the burner elements of the combustion zone in order to fulfill inspection, safety and operational requirements. The viewport 10 also resists thermal shock, heat transmission, conduction, convection, radiation, and the redirection/dissipation/transmission of heat from the interior of the combustion zone to the exterior of the combustion zone, while simultaneously compensating for thermal expansion when the inner casing assembly 24 and flange 56 are exposed to temperatures which may reach or exceed 1750° F.

In one embodiment of the viewport 10, the outer casing assembly 12, middle casing assembly 14 and inner casing assembly 24 may be of modular construction. In this embodiment, the inner casing assembly 24 may be initially welded to the exterior of the combustion zone as an individual component/assembly.

During installation, the flange 56 is positioned through the window through the wall of the combustion zone and extends into the interior of the combustion zone. In this engaged position, the interior surfaces 64 of the top inner casing wall 66, bottom inner casing wall 68, left inner casing wall 70 and right inner casing wall 72 function as insertion limiters, and are positioned adjacent to and in contact with the exterior wall of the combustion zone. In this inserted position the left inner casing edge 74, right inner casing edge 76, top inner casing edge 78 and bottom inner casing edge 80 may be welded to the exterior wall of the combustion zone.

In one embodiment, the top inner casing wall 66 and the bottom inner casing wall 68 each include at least two inner casing apertures 82. Each of the inner casing apertures 82 receives a bolt 52 which extends from the interior of the top inner casing wall 66 and bottom inner casing wall 68 extending outwardly towards the exterior of the combustion zone. In one embodiment the heads of the bolts 52 will be vertically aligned with the combustion zone wall, within the opening through the combustion zone wall, upon the completion of installation of the viewport 10. In the preferred embodiment the bolts 52 are inserted into the inner casing apertures 82 prior to the welding of the left inner casing edge 74, right inner casing edge 76, top inner casing edge 78 and bottom inner casing edge 80 to the exterior of the combustion zone wall.

After the inner casing assembly 24 has been welded to the exterior surface of the wall of the combustion zone, the first layer of insulation 38 is positioned adjacent to the outside surface 58 of the top inner casing wall 66, bottom inner casing wall 68, left inner casing wall 70 and right inner casing wall 72. In at least one embodiment, the first layer of insulation 38 includes a first layer top wall, a first layer bottom wall, the first layer left wall, and a first layer right wall. Each of the first layer top wall and first layer bottom wall include at least two first layer apertures 92. Each of the first layer apertures 92 is preferably horizontally aligned with a respective inner casing aperture 82, and receives a bolt 52 during assembly of the viewport 10. In at least one embodiment, the top edge of first layer top wall, the bottom edge of first layer bottom wall, the left edge of first layer left wall, and the right edge of first layer right wall are flush and aligned with the respective top inner casing edge 78, bottom inner casing edge 80, left inner casing edge 74 and right inner casing edge 76.

In at least one embodiment, a middle casing assembly 14 is releasably engaged to the inner casing assembly 24. The middle casing assembly 14 includes on the interior side (proximate to the inner casing assembly 24) a first middle plate 16 having a first plate top wall 94, a first plate bottom wall 96, first plate left wall 98 and a first plate right wall 100. The first plate top wall 94, first plate bottom wall 96, first plate left wall 98 and first plate right wall 100 are preferably vertical and are adjacent to, and in contact with, the respective first layer top wall, first layer bottom wall, first layer left wall and first layer right wall of the first layer of insulation 38.

The first plate top wall 94 and the first plate bottom wall 96 each include at least two first middle plate apertures 110 which are aligned with the first layer apertures 92. Each of the first middle plate apertures 110 receive a bolt 52.

Following the positioning of the bolts 52 through the respective first middle plate apertures 110, the middle casing assembly 14 may be tightly secured to the bolts 52 through the use of nuts 54. The inner casing assembly 24 has been previously welded to the exterior wall of the combustion zone with the bolts 52 passing from the interior surface 64 outwardly to the exterior of the combustion zone wall 11. The bolts 52 have also passed through the first layer apertures 92 and through the first middle plate apertures 110. The tightening of the nuts 54 onto the bolts 52 will securely attached the middle casing assembly 14 to the inner casing assembly 24, sandwiching the first layer of insulation 38 between the inner plate 28 and the first middle plate 16.

In at least one embodiment of the middle casing assembly 14, a middle top traverse plate 114 extends in a normal direction outwardly from the top edge of the first middle casing window opening 160. The middle top traverse plate 114 may be integral to the top edge of the first middle casing window opening 160 or may be affixed thereto through welding.

A middle bottom traverse plate 116 also extends in a normal direction outwardly from the bottom edge of the first middle casing window opening 160. The middle bottom traverse plate 116 may be integral to the bottom edge of the first middle casing window opening 160 or may be attached thereto by welding.

A middle left traverse plate 118 extends in a normal direction outwardly from the left edge of the first middle casing window opening 160. The middle left traverse plate 118 may be integral to the left edge of the first middle casing window opening 160 or may be welded thereto.

In addition, the middle right traverse plate 120 extends in a normal direction outwardly from the right edge of the first middle casing window opening 160. The middle right traverse plate 120 may be integral to the right edge of the first middle casing window opening 160 or may be affixed thereto by welding.

In at least one embodiment, a second middle plate 18 is integral or affixed to the exterior edges of each of the middle top traverse plate 114, middle bottom traverse plate 116, middle left traverse plate 118 and middle right traverse plate 120. The second middle plate 18 includes a second plate top wall 102 extending vertically upward and normal relative to the middle top traverse plate 114. A second plate bottom wall 104 is positioned vertically downward and normal relative to the middle bottom traverse plate 116. A second plate left wall 106 is positioned vertically outward and normal relative to the middle left traverse plate 118. A second plate right wall 108 is positioned vertically outward and normal relative to the middle right traverse plate 120.

Each of the combination of the first plate top wall 94, middle top traverse plate 114 and second plate top wall 102; first plate bottom wall 96, middle bottom traverse plate 116 and second plate bottom wall 104; first plate left wall 98, middle left traverse plate 118 and second plate left wall 106; and first plate right wall 100, middle right traverse plate 120 and second plate right wall 108 form a "U" shape which extends outwardly from the interior of the first middle casing window opening 160.

In at least one embodiment a top first middle positioning flange 122 and a top second middle positioning flange 130 extend downwardly and normally relative to the interior surface or underside of the middle top traverse plate 114. The middle bottom traverse plate 116 includes a bottom first middle positioning flange 124 and bottom second middle positioning flange 132 extending upwardly and normally relative to the interior surface or upper side of the middle bottom traverse plate 116. The middle left traverse plate 118 includes a left first middle positioning flange 128 and a left second middle positioning flange 134 extending inwardly and normally relative to the interior surface of the middle bottom traverse plate 116. The middle right traverse plate 120 includes a right first middle positioning flange 126 and a right second middle positioning flange 136 extending inwardly and normally relative to the interior surface of the middle bottom traverse plate 116.

Each of the top first middle positioning flange 122, bottom first middle positioning flange 124, left first middle positioning flange 128 and right first middle positioning flange 126 are spaced or offset inwardly relative to the respective inside surfaces of first plate top wall 94, first plate bottom wall 96, first plate left wall 98 and first plate right wall 100. An "L" shaped ledge is established proximate to the first middle casing window opening 160 between the respective underside of middle top traverse plate 114 and exterior surface of top first middle positioning flange 122; the upper side of middle bottom traverse plate 116 and the exterior surface of bottom first middle positioning flange 124; the inside surface of middle left traverse plate 118 and the exterior surface of left first middle positioning flange 128; and the inside surface of middle right traverse plate 120 and the exterior surface of right first middle positioning flange 126.

In another embodiment, the top first middle positioning flange 122, bottom first middle positioning flange 124, right first middle positioning flange 126 and left first middle positioning flange 128 may form a first stop plate having the first middle casing window opening 160. The first middle casing window opening 160 is preferably of the same size dimension as the inner casing window opening 158. In this embodiment, the first stop plate may be skip welded to the underside or interior surface of the respective middle top traverse plate 114, middle bottom traverse plate 116, middle left traverse plate 118 and middle right traverse plate 120 and offset as described relative to the top first middle positioning flange 122, bottom first middle positioning flange 124, right first middle positioning flange 126 and left first middle positioning flange 128. In this embodiment. The top first middle positioning flange 122, bottom first middle positioning flange 124, right first middle positioning flange 126 and left first middle positioning flange 128 are integral relative to each other forming the first stop plate. Alternatively, each of the top first middle positioning flange 122, bottom first middle positioning flange 124, right first middle positioning flange 126 and left first middle positioning flange 128 may be skip welded relative to the respective middle top traverse plate 114, middle bottom traverse plate 116, middle left traverse plate 118 and middle right traverse plate 120. Additionally the edges of the adjacent top first middle positioning flange 122, bottom first middle positioning flange 124, right first middle positioning flange 126 and left first middle positioning flange 128 may be welded to each other.

In addition, each of the top second middle positioning flange 130, bottom second middle positioning flange 132, left second middle positioning flange 134 and right second middle positioning flange 136 are spaced or offset inwardly relative to the respective second plate top wall 102, second plate bottom wall 104, second plate left wall 106 and second plate right wall 108. An "L" shaped ledge is established proximate to the first middle casing window opening 160 between the respective underside of middle top traverse plate 114 and exterior of top second middle positioning flange 130; the upper side of middle bottom traverse plate 116 and the exterior surface of bottom second middle positioning flange 132; the inside surface of middle left traverse plate 118 and the exterior surface of left second middle positioning flange 134; and inside surface of middle right traverse plate 120 and the exterior surface of right second middle positioning flange 136.

In another embodiment, the top second middle positioning flange 130, bottom second middle positioning flange 132, left second middle positioning flange 134 and right second middle positioning flange 136 may form a second stop plate having the second middle window opening 168. The second middle window opening 168 is preferably of the same size dimension as the first middle casing window opening 160. In this embodiment, the second stop plate may be skip welded to the underside or interior surface of the respective middle top traverse plate 114, middle bottom traverse plate 116, middle left traverse plate 118 and middle right traverse plate 120 and offset as described relative to the top second middle positioning flange 130, bottom second middle positioning flange 132, left second middle positioning flange 134 and right second middle positioning flange 136. In this embodiment. The top second middle positioning flange 130, bottom second middle positioning flange 132, left second middle positioning flange 134 and right second middle positioning flange 136 are integral relative to each other forming the second stop plate. Alternatively, each of the top second middle positioning flange 130, bottom second middle positioning flange 132, left second middle positioning flange 134 and right second middle positioning flange 136 may be skip welded relative to the respective middle top traverse plate 114, middle bottom traverse plate 116, middle left traverse plate 118 and middle right traverse plate 120. Additionally the edges of the adjacent top second middle positioning flange 130, bottom second middle positioning flange 132, left second middle positioning flange 134 and right second middle positioning flange 136 may be welded to each other.

Each combination of top first middle positioning flange 122 and the underside surface of the middle top traverse plate 114 and top second middle positioning flange 130; the bottom first middle positioning flange 124 and the upper surface of middle bottom traverse plate 116 and bottom second middle positioning flange 132; the left first middle positioning flange 128 and the inside surface of middle left traverse plate 118 and the left second middle positioning flange 134; and the right first middle positioning flange 126 and the inside surface of middle right traverse plate 120 and right second middle positioning flange 136 forms an inverted smaller "u" shape which extends towards the first middle casing window opening 160.

In at least one embodiment, an "L-shaped" third layer of insulation 42 is positioned in each of the ledges between the underside surface of middle top traverse plate 114 and the exterior surface of the top first middle positioning flange 122, the upper surface of the middle bottom traverse plate 116 in the exterior surface of the bottom first middle positioning flange 124, the inside surface of the middle left traverse plate 118 and the exterior surface of the left first middle positioning flange 128 and the inside surface of the middle right traverse plate 120 and the exterior surface of the right first middle positioning flange 126.

In at least one embodiment, the first or inner insulated pane of glass 36 is rectangular in shape and is formed of quartz glass. The upper edge 37 of first or inner insulated pane of glass 36 is in contact with the horizontal portion of third layer of insulation 42 below the first plate top wall 94, under the middle top traverse plate 114 and the exterior of the top first middle positioning flange 122. In addition, the interior surface proximate to the upper edge 37 of first or inner insulated pane of glass 36 is in contact with the vertical portion of third layer of insulation 42 which is exterior to the top first middle positioning flange 122.

The lower edge 39 of first or inner insulated pane of glass 36 is in contact with the horizontal portion of third layer of insulation 42 above the first plate bottom wall 96 and middle bottom traverse plate 116. In addition, the interior surface proximate to the lower edge 39 of first or inner insulated pane of glass 36 is in contact with the vertical portion of third layer of insulation 42 which is exterior to bottom first middle positioning flange 124.

In this embodiment, the left edge 41 of first or inner insulated pane of glass 36 is in contact with the vertical portion of third layer of insulation 42 to the interior of first plate left wall 98 and middle left traverse plate 118. In addition the interior surface proximate to the left edge 41 of first or inner insulated pane of glass 36 is in contact with the vertical portion of third layer of insulation 42 which is exterior to the left first middle positioning flange 128.

In this embodiment, the right edge 43 of first or inner insulated pane of glass 36 is in contact with the vertical portion of third layer of insulation 42 to the interior of first plate right wall 100 and middle right traverse plate 120. In addition, the interior surface proximate to the right edge 43 of first or inner insulated pane of glass 36 is in contact with the vertical portion of third layer of insulation 42 which is exterior to the right first middle positioning flange 126.

During assembly of the viewport 10, the first or inner insulated pane of glass 36 is squeezed and sandwiched between the "L-shape" third layer of insulation 42 and the first layer of insulation 38 following tightening of the bolts 52 and nuts 54. The first or inner insulated pane of glass 36 is positioned proximate to the third layer of insulation 42 and top first middle positioning flange 122, bottom first middle positioning flange 124, right first middle positioning flange 126 and left first middle positioning flange 128 prior to the tightening of the bolts 52 and nuts 54, attaching the first middle plate 16 to the inner casing assembly 24.

In at least one embodiment, an "L-shaped" fourth layer of insulation 46 is positioned in each of the middle top traverse plate 114 and the exterior surface of the top second middle positioning flange 130; the upper surface of the middle bottom traverse plate 116 and the exterior surface of the bottom second middle positioning flange 132; the inside surface of the middle left traverse plate 118 and the exterior surface of the left second middle positioning flange 134; and the inside surface of the middle right traverse plate 120 and the exterior surface of the right second middle positioning flange 136.

In at least one embodiment, the second or outer insulated pane of glass 44 is rectangular in shape and is formed of quartz glass or another type of high temperature glass material. The upper edge 45 of second or outer insulated pane of glass 44 is in contact with the horizontal portion of fourth layer of insulation 46 below the second plate top wall 102, under the middle top traverse plate 114 and to the exterior of the top second middle positioning flange 130. In addition, the interior surface proximate to the upper edge 45 of second or outer insulated pane of glass 44 is in contact with the vertical portion of fourth layer of insulation 46 which is exterior to the top second middle positioning flange 130.

The lower edge 47 of second or outer insulated pane of glass 44 is in contact with the horizontal portion of fourth layer of insulation 46 above the second plate bottom wall 104 and middle bottom traverse plate 116. In addition, the interior surface proximate to the lower edge 47 of second or outer insulated pane of glass 44 is in contact with the vertical portion of fourth layer of insulation 46 which is exterior to bottom second middle positioning flange 132.

In this embodiment, the left edge 48 of second or outer insulated pane of glass 44 is in contact with the vertical portion of fourth layer of insulation 46 to the interior of second plate left wall 106 and middle left traverse plate 118. In addition, the interior surface proximate to the left edge 48 of second or outer insulated pane of glass 44 is in contact with the vertical portion of fourth layer of insulation 46 which is exterior to the left second middle positioning flange 134.

In this embodiment, the right edge 49 of second or outer insulated pane of glass 44 is in contact with the vertical portion of fourth layer of insulation 46 to the interior of second plate right wall 108 and middle right traverse plate 120. In addition, the interior surface proximate to the right edge 49 of second or outer insulated pane of glass 44 is in contact with the vertical portion of fourth layer of insulation 46 which is exterior to the right second middle positioning flange 136.

During assembly of the viewport 10, the second or outer insulated pane of glass 44 is squeezed and sandwiched between the "L-shape" fourth layer of insulation 46 and the second layer of insulation 40 following tightening of the threaded rods 30 and nuts 32.

In at least one embodiment, the second layer of insulation 40 includes a second layer top wall, a second layer bottom wall, a second layer left wall and a second layer right wall. Each of the second layer top wall and second layer bottom wall include at least two second layer apertures 146. Each second layer apertures 146 are preferably horizontally aligned with a second middle plate apertures 112 and receive a threaded rod 30 during assembly of the viewport 10. In at least one embodiment, the top edge of second layer top wall, the bottom edge of second layer bottom wall, the left edge of second layer left wall and the right edge of second layer right wall are flush and aligned with the respective exterior edges of the second middle plate 18.

In at least one embodiment, the second layer of insulation 40 includes a centrally located rectangular second layer window opening 166. The second layer window opening 166 is preferably aligned relative to the outer casing window opening 162.

In at least one embodiment, the outer casing assembly 12 includes a top outer casing wall, a bottom outer casing wall, a left outer casing wall and a right outer casing wall. Each of the top outer casing wall and bottom outer casing wall preferably include at least two outer casing apertures 156. The outer casing assembly 12 also includes a rectangular outer casing window opening 162 which has the same size dimensions as the inner casing window opening 158 and first middle casing window opening 160, and is horizontally aligned relative thereto.

In at least one embodiment, the top outer casing wall has the same size dimensions as the second layer top wall. The top outer casing wall is adjacent to and is aligned with the second layer top wall. The bottom outer casing wall has the same size dimensions as the second layer bottom wall. The bottom outer casing wall is adjacent to and is aligned with the top outer casing wall. The left outer casing wall has the same size dimensions as the second layer left wall. The left outer casing wall is adjacent to and is aligned with the second layer left wall. The right outer casing wall has the same size dimensions as the second layer right wall. The right outer casing wall is adjacent to and is aligned with the second layer right wall.

In at least one embodiment, a plurality of threaded rods 30 pass from the exterior of the top outer casing wall and bottom outer casing wall inwardly through the aligned outer casing apertures 156, second layer apertures 146 and second middle plate apertures 112. A nut 32 may then be connected to each threaded rod 30 and may be tightened to secure the outer casing assembly 12, fourth layer of insulation 46 and the second middle plate 18, pressing and holding the second or outer insulated pane of glass 44 between the second layer of insulation 40 and the fourth layer of insulation 46. It should be noted that the nuts 32 are rotatably engaged to the threaded rods 30 in the space between the first middle plate 16 and second middle plate 18, and exterior to the middle top traverse plate 114 (above) and middle bottom traverse plate 116 (below).

In at least one embodiment, each of the middle top traverse plate 114, middle bottom traverse plate 116, middle left traverse plate 118 and middle right traverse plate 120 have a width dimension of approximately 1 and 13⁄16 inches and a length/height dimension of 10½ inches.

In other embodiments, the width dimension of the middle top traverse plate 114, middle bottom traverse plate 116, middle left traverse plate 118 and middle right traverse plate 120 may be larger or smaller than 1 and 13⁄16 inches and the length/height dimension may be larger or smaller than 10½ inches.

In at least one embodiment, each of the inner casing window opening 158, first middle casing window opening 160, outer casing window opening 162, first layer window opening 164, second layer window opening 166 and second middle window opening 168 may have a height dimension of 6 inches and a width dimension of 9 inches. In other embodiments, the height dimension of the inner casing window opening 158, first middle casing window opening 160, outer casing window opening 162, first layer window opening 164, second layer window opening 166 and second middle window opening 168 may be larger or smaller than 6 inches and the width dimension may be larger or smaller than 9 inches.

In at least one embodiment, the width dimension of the flange 56 is 6¾ inches and the depth dimension is 3 inches. In other embodiments, the width dimension of flange 56 may be larger or smaller than 6¾ inches and the depth dimension may be larger or smaller than 3 inches.

In at least one embodiment, each of the first layer of insulation 38 and second layer of insulation 40 have a length dimension of 13 inches and a height dimension of 11 inches. In other embodiments the length dimension for the first layer of insulation 38 and second layer of insulation 40 may be larger or smaller than 13 inches and the height dimension may be larger or smaller than 11 inches.

In at least one embodiment, the first or inner insulated pane of glass 36 and the second or outer insulated pane of glass 44 have a thickness dimension of ¼ inch, a height dimension of 7 inches and a width dimension of 10 inches. In alternative embodiments the thickness dimension for the first or inner insulated pane of glass 36 and second or outer insulated pane of glass 44 may be larger or smaller than ¼ inch, the height dimension may be larger or smaller than 7 inches and the width dimension may be larger or smaller than 10 inches.

In at least one embodiment, the first middle plate 16, second middle plate 18, inner plate 28 and outer casing assembly 12 have a width dimension of 14 inches and a height dimension of 13 inches. In other embodiments the width dimension for the first middle plate 16, second middle plate 18, inner plate 28 and outer casing assembly 12 may be larger or smaller than 14 inches and the height dimension may be larger or smaller than 13 inches.

In one embodiment the metallic elements of the inner casing assembly 24, the middle casing assembly 14 and the outer casing assembly 12 are formed of 310 stainless steel. The second or outer insulated pane of glass 44 may be formed of quartz or other high temperature glass material and the first or inner insulated pane of glass 36 is formed of quartz glass. The first layer of insulation 38, second layer of insulation 40, third layer of insulation 42, and fourth layer of insulation 46 are formed of ceramic fiber.

The use of 310 stainless steel for the metallic materials for the inner casing assembly 24, middle casing assembly 14 and outer casing assembly 12 resists corrosion to the exterior and interior of the viewport 10. In addition, 310 stainless steel material for the inner casing assembly 24, middle casing assembly 14 and outer casing assembly 12 resists degradation resulting from long-term exposure to adverse weather conditions (freezing, heat, moisture).

The second or outer insulated pane of glass 44 and the first or inner insulated pane of glass 36 resist filming and clouding, allowing an individual to observe the burners to identify burner sag, to confirm that flames do not touch tubes/wall/roof of the combustion zone, and to provide observation of the flame color and pattern of the burners. The first or inner insulated pane of glass 36, inner casing assembly 24 and flange 56 additionally are resistant to the corrosive effects of flame, environment, and temperature cycling occurring within the combustion zone during use.

In at least one embodiment the modular construction for the outer casing assembly 12, middle casing assembly 14 and inner casing assembly 24 as well as the first or inner insulated pane of glass 36, second or outer insulated pane of glass 44, first layer of insulation 38, second layer of insulation 40, third layer of insulation 42 and fourth layer of insulation 46 facilitates the cleaning, repair or replacement of any of the respective elements of the viewport 10. The viewport 10 as properly installed onto a combustion zone seals air and gasses inside the combustion zone. Combustion gas and air are prohibited from exiting the combustion zone through the viewport 10.

The viewport 10 protects users from exposure to excessive heat and risk of burns, improving the safety to individuals. Thermal transfer from the burners through the viewport 10 is minimized by the use of the dual panes of glass, the 310 stainless steel for the metallic components, and the ceramic fiber for the first layer of insulation 38, second layer of insulation 40, third layer of insulation 42 and fourth layer of insulation 46. The first layer of insulation 38, second layer of insulation 40, third layer of insulation 42 and fourth layer of insulation 46 simultaneously function as insulation and as gaskets between the component elements or assemblies of the viewport 10. In at least one embodiment the use of quartz glass may be replaced with borosilicate glass or other types of high temperature glass materials.

In a first example the thermal expansion for the Quartz Glass is 0.00000055; and for the Borosilicate Glass is 0.00000325 1/c. The Original Length of the Quartz Glass is 0.2286; and the Borosilicate Glass is 0.2286 in meters. The Original Width of the Quartz Glass is 0.1524; and the Borosilicate Glass is 0.1524 in meters. The thickness of the Quartz Glass is 0.00635 and the Borosilicate Glass is 0.00635 in meters. The change in temperature for the Quartz Glass is 930 degrees; and the Borosilicate Glass is 930 degrees Celsius. The Young's modulus for the Quartz Glass is 71.7; and the Borosilicate Glass is 64 GPa. The compression crushing strength for the Quartz Glass is 1100; and for the Borosilicate Glass is 2000 Mpa, The change in length for the Quartz Glass is 0.000116929; and the Borosilicate Glass is 0.000690944 in meters. The change in width for the Quartz Glass is 7.79526E-05; and the Borosilicate Glass is 0.000460629 in meters. The E L for the Quartz Glass is 0.0005115; and the Borosilicate Glass is 0.0030225 in m/m. The E W for the Quartz Glass is 0.0005115; and the Borosilicate Glass is 0.0030225 in m/m. The a L for the Quartz Glass is 36.67455; and the Borosilicate Glass is 193.44 in MPa. The a W for the Quartz Glass is 36.67455; and the Borosilicate Glass is 273.5654715 in MPa. The Annealing Point (F) for the Quartz Glass is 2192; and the Borosilicate Glass is 1040 degrees (F.). The maximum temperature for the Quartz Glass is 3092; and the Borosilicate Glass is 932 degrees (F.).

In a second example ⅜" and ¼" bolts formed of 310 Stainless steel were used. The bolts had a stress force in (lb-in) of 41.83; and a moment in (lb-in) of 45.79. In addition, the weld stresses were Pressure (psi) 44; Area (in2) 24.75; Force (lbf) 1089; Weld length (in) 0.5; Number of welds 32; Weld size (in)(leg) 0.125; Weld area zy (in2) 0.00781; Weld area zx (in2) 0.0625; Weld area xy (in2) 0.0625; Stress Normal (psi) 1742; Stress Shear (psi) 1742; Yield Strength (psi) 30000; Weight (lbf) 38.3; Area (in2) 2.39; Moment (lbf-in) 45.8; Moment of inertia (in4) 27.9; Shear Stress (psi) 16.0; Normal Stress (psi) 6.66; Von Mises Stress (psi) 28.5; and Yield Strength (psi) 30000. The frame stresses were Weight (lbf) 20.5; Moment (lbf-in) 22.1; Shear Stress (psi) 2.30; Normal Stress (psi) 0.950; Von Mises Stress (psi) 4.10; and Yield Strength (ksi) 30.0.

Temperature table 1 provided values of:

| Parameter | Base Value | Units | Vary by % | Amount | min | max | Other Value |
|---|---|---|---|---|---|---|---|
| Int. Temp | 1760 | ° F. | 15% | 520 | 1500 | 2020 | — |
| Externa! Temp | 71.6 | ° F. | 55% | 79.2 | 32 | 111.2 | — |
| Int. Convection | 1.71E−03 | Btu/sft^2F | 50% | 1.71E−03 | 8.56E−04 | 2.57E−03 | — |
| Ext. Convection | 1.18E−03 | Btu/sft^2F | 50% | 1.18E−03 | 5.89E−04 | 1.77E−03 | — |
| Cooling Air Temp. | 71.6 | ° F. | 100% | 71.6 | 71.6 | 111.2 | |
| Cooling Air Convection | 0 | Btu/sft^2F | — | 4.89E−03 | 0.00489 | 9.78E−03 | 4.89E−03 |

-continued

| Parameter | Base Value | Units | Vary by % | Amount | min | max | Other Value |
|---|---|---|---|---|---|---|---|
| Contact Conductivity | 0.181 | Btu/sft^2F | 30% | 0.1086 | 0.1267 | 0.2353 | — |
| 310 SS Conductivity | 2.09E−03 | Btu/sftF | 30% | 1.25E−03 | 1.46E−03 | 2.72E−03 | — |
| 316 SS Conductivity | 2.09E−03 | Btu/sftF | 30% | 1.25E−03 | 1.46E−03 | 2.72E−03 | — |
| Internal Radiation Temp. | 3542 | F. | 30% | 2138 | 2489 | 4595 | — |
| Emissivity | 0.85 | — | 0.5 | 0.5 | 0.5 | 1 | — |

Temperature table 2 provided values with no cooling air of:

| Parameter | Base Value | Units |
|---|---|---|
| Int. Temp | 1760 | ° F. |
| External Temp | 71.6 | ° F. |
| Int. Convection | 1.71E−03 | Btu/sft^2F |
| Ext. Convection | 1.18E−03 | Btu/sft^2F |
| Cooling Air Temp. | 71.6 | ° F. |
| Cooling Air Convection | 0 | Btu/sft^2F |
| Contact Conductivity | 0.181 | Btu/sft^2F |
| 310 SS Conductivity | 2.09E−03 | Btu/sftF |
| 316 SS Conductivity | 2.09E−03 | Btu/sftF |
| Internal Radiation Temp. | 3542 | F. |
| Emissivity | 0.85 | — |

In one embodiment an example of the ceramic fiber used for insulation was supplied by Gasket, Inc. in 24" stock sheet, ¼" thick. The Fused Quartz Glass Panes were obtained from Technical Glass Products. In one embodiment the viewport 10 provides a 108 degree horizontal and 85 degree vertical field of view. In at least one embodiment the viewport 10 minimizes heat transmission including conduction, convection and radiation.

In at least one first alternative embodiment a viewport for a combustion zone includes an inner casing assembly 24, the inner casing assembly 24 having an inner plate 28, an inner casing window opening 158 disposed centrally relative to the inner plate 28, the inner plate 28 being attached to an exterior surface of a wall 11 of the combustion zone, the inner casing assembly 24 further having a flange 56 extending from the inner plate 28 into said interior of the combustion zone, the inner plate 28 having an exterior inner plate surface 58; a first layer of insulation 38 formed of ceramic fiber positioned adjacent to the exterior inner plate surface 58, the first layer of insulation 38 having a first layer window opening 164, the first layer window opening 164 being aligned relative to the inner plate 28, the first layer window opening 164 having a first layer window opening size dimension; a middle casing assembly 14, the middle casing assembly 14 being positioned adjacent and exterior to the first layer of insulation 38, the middle casing assembly 14 comprising a first middle plate 16 having a first middle casing window opening 160, a plurality of traverse plates integral to and extending normally from the first middle plate 16 proximate to the first middle casing window opening 160, and second middle plate 18 having a second middle window opening 168, the second middle plate 18 being integral with the plurality of traverse plates proximate to the first middle casing window opening 160, the second middle plate 18 having an exterior second middle plate surface 22, the first middle casing window opening 160 having a first middle casing window opening size dimension, the second middle window opening 168 having a second middle window opening size dimension; a first or inner insulated pane of glass 36 being disposed between the first middle plate 16 and the first layer of insulation 38, the first or inner insulated pane of glass 36 having a first or inner insulated pane of glass size dimension, the first or inner insulated pane of glass size dimension being larger than the first middle casing window opening size dimension and the first layer window opening 164 size dimension; a second layer of insulation 40 formed of ceramic fiber positioned adjacent to the exterior second middle plate surface 22, the second layer of insulation 40 having a second layer window opening 166, the second layer window opening 166 being aligned relative to the second middle window opening 168, the second layer window opening 166 having a second layer window opening size dimension; a second or outer insulated pane of glass 44 being disposed between the second middle plate 18 and the second layer of insulation 40, the second or outer insulated pane of glass 44 having a second or outer insulated pane of glass size dimension which is larger than the second middle window opening size dimension and the second layer window opening size dimension; and an outer casing assembly 12, the outer casing assembly 12 having an outer casing window opening 162, the outer casing window opening 162 being aligned relative to the second layer window opening 166, wherein first fasteners extend outwardly from the interior of the combustion zone, the first fasteners engaging the inner plate 28, the first layer of insulation 38 and the first middle plate 16, wherein tightening the first fasteners squeeze the first or inner insulated pane of glass 36 between the middle casing assembly 14 and the inner plate 28, and further wherein second fasteners extend inwardly from the outer casing assembly 12, the second fasteners engaging the outer casing assembly 12, the second layer of insulation 40 and the second middle plate 18, wherein tightening of the second fasteners squeeze the second or outer insulated pane of glass 44 between the second layer of insulation 40 and the second middle plate 18 and further wherein the first fasteners may be released from the inner casing assembly 24, the first layer of insulation 38 and the middle casing assembly 14, whereupon the outer casing assembly 12 and middle casing assembly 14 may be separated from the inner casing assembly 24.

In a second alternative embodiment according to the first embodiment, the middle casing assembly 14 further comprises a middle top traverse plate 114, a middle bottom traverse plate 116, a middle left traverse plate 118 and a middle right traverse plate 120, each of the middle top traverse plate 114, the middle bottom traverse plate 116, the middle left traverse plate 118, and the middle right traverse plate 120 have an outside and an inside.

In a third alternative embodiment according to the second embodiment, the first middle plate 16 further comprises a first plate top wall 94, a first plate bottom wall 96, a first plate left wall 98 and a first plate right wall 100, the first plate top wall 94 extending perpendicularly upward from the outside of the middle top traverse plate 114, the first plate bottom wall 96 extending perpendicularly downward from the outside of the middle bottom traverse plate 116, the first plate left wall 98 extending perpendicularly outward from the outside of the middle left traverse plate 118, and the first plate right wall 100 extending perpendicularly outward from the outside of the middle right traverse plate 120.

In a fourth alternative embodiment according to the third embodiment, the second middle plate 18 further comprises a second plate top wall 102, a second plate bottom wall 104, a second plate left wall 106 and a second plate right wall 108, the second plate top wall 102 extending perpendicularly upward from the outside of the middle top traverse plate 114, the second plate bottom wall 104 extending perpendicularly downward from the outside of the middle bottom traverse plate 116, the second plate left wall 106 extending perpendicularly outward from the outside of the middle left traverse plate 118 and the second plate right wall 108 extending perpendicularly outward from the outside of the middle right traverse plate 120.

In a fifth alternative embodiment according to the fourth embodiment, the middle top traverse plate 114 has a top first middle positioning flange 122 and a top second middle positioning flange 130, the top first middle positioning flange 122 and the top second middle positioning flange 130 extending inwardly from the inside of the middle top traverse plate 114.

In a sixth alternative embodiment according to the fifth embodiment, the middle bottom traverse plate 116 has a bottom first middle positioning flange 124 and a bottom second middle positioning flange 132, the bottom first middle positioning flange 124 and the bottom second middle positioning flange 132 extending inwardly from the inside of the middle bottom traverse plate 116.

In a seventh alternative embodiment according to the sixth embodiment, the middle left traverse plate 118 has a left first middle positioning flange 128 and a left second middle positioning flange 134, the left first middle positioning flange 128 and the left second middle positioning flange 134 extending inwardly from the inside of the middle left traverse plate 118.

In an eighth alternative embodiment according to the seventh embodiment, the middle right traverse plate 120 has a right first middle positioning flange 126 and a right second middle positioning flange 136, the right first middle positioning flange 126 and the right second middle positioning flange 136 extending inwardly from the inside of the middle right traverse plate 120.

In a ninth alternative embodiment according to the eighth embodiment, the top first middle positioning flange 122 is offset relative to the first plate top wall 94, and further wherein a third layer of insulation 42 is disposed adjacent to the inside of the middle top traverse plate 114 and proximate to the top first middle positioning flange 122.

In a tenth alternative embodiment according to the ninth embodiment, the first or inner insulated pane of glass 36 has a first or inner insulated pane of glass upper edge 37, the first or inner insulated pane of glass upper edge 37 being in contact with the third layer of insulation 42 disposed adjacent to the inside of the middle top traverse plate 114 and proximate to the top first middle positioning flange 122.

In an eleventh alternative embodiment according to the tenth embodiment, the bottom first middle positioning flange 124 is offset relative to the first plate bottom wall 96, and further wherein the third layer of insulation 42 is disposed adjacent to the inside of the middle bottom traverse plate 116 proximate to the bottom first middle positioning flange 124.

In a twelfth alternative embodiment according to the eleventh embodiment, the first or inner insulated pane of glass 36 has a first or inner insulated pane of glass lower edge 39, the first or inner insulated pane of glass lower edge 39 is in contact with the third layer of insulation 42 disposed adjacent to the inside of the middle bottom traverse plate 116 and proximate to the bottom first middle positioning flange 124.

In a thirteenth alternative embodiment according to the twelfth embodiment, the left first middle positioning flange 128 is offset relative to the first plate left wall 98, and further wherein the third layer of insulation 42 is disposed adjacent to the inside of the middle left traverse plate 118 and proximate to the left first middle positioning flange 128.

In a fourteenth alternative embodiment according to the thirteenth embodiment, the first or inner insulated pane of glass 36 has a first or inner insulated pane of glass left edge 41, the first or inner insulated pane of glass left edge 41 being in contact with the third layer of insulation 42 disposed adjacent to the inside of the middle left traverse plate 118 and proximate to the left first middle positioning flange 128.

In a fifteenth alternative embodiment according to the fourteenth embodiment, the right first middle positioning flange 126 is offset relative to the first plate right wall 100, and further wherein the third layer of insulation 42 is disposed adjacent to the inside of the middle right traverse plate 120 and proximate to the right first middle positioning flange 126.

In a sixteenth alternative embodiment according to the fifteenth embodiment, the first or inner insulated pane of glass 36 has a first or inner insulated pane of glass right edge 43, the first or inner insulated pane of glass right edge 43 being in contact with the third layer of insulation 42 disposed adjacent to the inside of the middle right traverse plate 120 and proximate to the right first middle positioning flange 126.

In a seventeenth alternative embodiment according to the sixteenth embodiment, the top second middle positioning flange 130 is offset relative to the second plate top wall 102, and further wherein a fourth layer of insulation 46 is disposed adjacent to the inside of the middle top traverse plate 114 and proximate to the top second middle positioning flange 130.

In an eighteenth alternative embodiment according to the seventeenth embodiment, the second or outer insulated pane of glass 44 has a second or outer insulated pane of glass upper edge 45, the second or outer insulated pane of glass upper edge 45 being in contact with the fourth layer of insulation 46 disposed adjacent to the inside of the middle top traverse plate 114 and proximate to the top second middle positioning flange 130.

In a nineteenth alternative embodiment according to the eighteenth embodiment, the bottom second middle positioning flange 132 is offset forwardly relative to the second plate bottom wall 104, and further wherein the fourth layer of insulation 46 is disposed adjacent to the inside of the middle bottom traverse plate 116 and proximate to the bottom second middle positioning flange 132.

In a twentieth alternative embodiment according to the nineteenth embodiment, the second or outer insulated pane of glass 44 has a second or outer insulated pane of glass lower edge 47, the second or outer insulated pane of glass lower edge 47 being in contact with the fourth layer of insulation 46 disposed adjacent to the inside of the middle bottom traverse plate 116 and proximate to the bottom second middle positioning flange 132.

In a twenty-first alternative embodiment according to the twentieth embodiment, the left second middle positioning flange 134 is offset relative to the second plate left wall 106, and further wherein the fourth layer of insulation 46 is disposed adjacent to the inside of the middle left traverse plate 118 and proximate to the left second middle positioning flange 134.

In a twenty-second alternative embodiment according to the twenty-first embodiment, the second or outer insulated pane of glass 44 has a second or outer insulated pane of glass left edge 48, the second or outer insulated pane of glass left edge 48 being in contact with the fourth layer of insulation 46 disposed adjacent to the inside of the middle left traverse plate 118 and proximate to the left second middle positioning flange 134.

In a twenty-third alternative embodiment according to the twenty-second embodiment, the right second middle positioning flange 136 is offset relative to the second plate right wall 108 and further wherein the fourth layer of insulation 46 is disposed adjacent to the inside of the middle right traverse plate 120 and proximate to the right second middle positioning flange 136.

In a twenty-fourth alternative embodiment according to the twenty-third embodiment, the second or outer insulated pane of glass 44 has a second or outer insulated pane of glass right edge 49, the second or outer insulated pane of glass right edge 49 being in contact with the fourth layer of insulation 46 disposed adjacent to the inside of the middle right traverse plate 120 and proximate to the right second middle positioning flange 136.

In a twenty-fifth alternative embodiment according to the twenty-fourth embodiment, the flange 56 is box-shaped, the flange 56 being constructed and arranged to shield the viewport 10 from flames.

In a twenty-sixth alternative embodiment according to the twenty-fifth embodiment, the first layer of insulation 38, the first or inner insulated pane of glass 36, the second layer of insulation 40, the second or outer insulated pane of glass 44, the third layer of insulation 42, and the fourth layer of insulation 46 provide an operational temperature for the outer casing assembly 12, said operational temperature being equal to or less than 225° F.

In a twenty-seventh alternative embodiment according to the twenty-sixth embodiment, the inner plate 28, the first layer of insulation 38 and the first middle plate 16 each include a plurality of aligned first fastener openings, each of the first fastener openings receiving one of the first fasteners.

In a twenty-eighth alternative embodiment according to the twenty-seventh embodiment, the second middle plate 18, the second layer of insulation 40 and the outer casing assembly 12 each include a plurality of aligned second fastener openings, each of the second fastener openings receiving one of the second fasteners.

In a twenty-ninth alternative embodiment according to the twenty-eighth embodiment, the flange 56 is affixed to the inner plate 28 by welding, and the inner plate 28 is affixed to the exterior surface of the combustion zone by welding.

In a thirtieth alternative embodiment according to the twenty-ninth embodiment, the first plate top wall 94 is attached to the middle top traverse plate 114, the first plate bottom wall 96 is attached to the middle bottom traverse plate 116, the first plate left wall 98 is attached to the middle left traverse plate 118, the first plate right wall 100 is attached to the middle right traverse plate 120, the second plate top wall 102 is attached to the middle top traverse plate 114, the second plate bottom wall 104 is attached to the middle bottom traverse plate 116, the second plate left wall 106 is attached to the middle left traverse plate 118, the second plate right wall 108 is attached to the middle right traverse plate 120, the top first middle positioning flange 122 is attached to the middle top traverse plate 114, the bottom first middle positioning flange 124 is attached to the middle bottom traverse plate 116, the right first middle positioning flange 126 is attached to the middle right traverse plate 120, the left first middle positioning flange 128 is attached to s the middle left traverse plate 118, the top second middle positioning flange 130 is attached to the middle top traverse plate 114, the bottom second middle positioning flange 132 is attached to the middle bottom traverse plate 116, the left second middle positioning flange 134 is attached to the middle left traverse plate 118 and the right second middle positioning flange 136 is attached to the middle right traverse plate 120 by welding.

In a thirty-first alternative embodiment according to the thirtieth embodiment, the inner casing window opening 158, the first middle casing window opening 160, the outer casing window opening 162, the first layer window opening 164, the second layer window opening 166 and the second middle window opening 168 have a height dimension equal to or exceeding 6 inches and a length dimension equal to or exceeding 9 inches.

In a thirty-second alternative embodiment according to the thirty-first embodiment, the first plate top wall 94 is attached to the middle top traverse plate 114 opposite of the second plate top wall 102, the first plate bottom wall 96 is attached to the middle bottom traverse plate 116 opposite to the second plate bottom wall 104, the first plate left wall 98 is attached to the middle left traverse plate 118 opposite to the second plate left wall 106 and the first plate right wall 100 is attached to the middle right traverse plate 120 opposite to the second plate right wall 108.

In a thirty-third alternative embodiment according to the thirty-second embodiment, the first plate top wall 94 and the top first middle positioning flange 122 extend perpendicularly outwardly from the middle top traverse plate 114 in an opposite direction, the first plate bottom wall 96 and the bottom first middle positioning flange 124 extend perpendicularly outwardly from the middle bottom traverse plate 116 in an opposite direction, the first plate left wall 98 and the left first middle positioning flange 128 extend perpendicularly outwardly from the middle left traverse plate 118 in an opposite direction, and the first plate right wall 100 and the right first middle positioning flange 126 extend perpendicularly outwardly from the middle right traverse plate 120 in an opposite direction.

In a thirty-fourth alternative embodiment according to the thirty-third embodiment, the second plate top wall 102 and the top second middle positioning flange 130 extend perpendicularly outwardly from the middle top traverse plate 114 in an opposite direction, the second plate bottom wall 104 and the bottom second middle positioning flange 132 extend perpendicularly outwardly from the middle bottom traverse plate 116 in an opposite direction, the second plate left wall 106 and the left second middle positioning flange 134 extend perpendicularly outwardly from the middle left traverse plate 118 in an opposite direction, and the second plate right wall 108 and the right second middle positioning flange 136 extend perpendicularly outwardly from the middle right traverse plate 120 in an opposite direction.

In a thirty-fifth alternative embodiment according to the thirty-fourth embodiment, the middle casing assembly 14 has an air intake port 60 and an air exhaust port 62.

In a thirty-sixth alternative embodiment according to the thirty-fifth embodiment, the middle casing assembly 14 has a plurality of the air intake ports 60 and a plurality of the air exhaust ports 62.

In a thirty-seventh alternative embodiment according to the thirty-sixth embodiment, at least one of the air intake ports 60 is disposed through at least one of the middle bottom traverse plate 116, the middle left traverse plate 118 and the middle right traverse plate 120.

In a thirty-eighth alternative embodiment according to the thirty-seventh embodiment, at least one of the air exhaust ports 62 is disposed through at least one of the middle bottom traverse plate 116, the middle left traverse plate 118 and the middle right traverse plate 120.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

We claim:

1. A viewport for a temperature zone, said viewport comprising:

an inner casing assembly, said inner casing assembly having an inner plate, an inner casing window opening disposed centrally relative to said inner plate, said inner plate being attached to an exterior surface of a wall of said temperature zone, said inner casing assembly further having a flange extending from said inner plate through said wall, said inner plate having an exterior inner plate surface;

a first layer of insulation formed of ceramic fibers positioned adjacent to said exterior inner plate surface, said first layer of insulation having a first layer window opening, said first layer window opening being aligned relative to said inner plate, said first layer window opening having a first layer window opening size dimension;

a middle casing assembly, said middle casing assembly being positioned adjacent and exterior to said first layer of insulation, said middle casing assembly comprising a first middle plate having a first middle casing window opening, a plurality of traverse plates integral to and extending normally from said first middle plate proximate to said first middle casing window opening, and a second middle plate having a second middle window opening, said second middle plate being integral with said plurality of traverse plates proximate to said first middle casing window opening, said second middle plate having an exterior second middle plate surface, said first middle casing window opening having a first middle casing window opening size dimension, said second middle window opening having a second middle window opening size dimension;

a first insulated pane of glass formed of quartz disposed between said first middle plate and said first layer of insulation, said first insulated pane of glass having a first, inner insulated pane of glass size dimension, said first insulated pane of glass size dimension being larger than said first middle casing window opening size dimension and said first layer window opening size dimension;

a second layer of insulation formed of ceramic fibers positioned adjacent to said exterior second middle plate surface, said second layer of insulation having a second layer window opening, said second layer window opening being aligned relative to said second middle window opening, said second layer window opening having a second layer window opening size dimension;

a second insulated pane of glass formed of quartz disposed between said second middle plate and said second layer of insulation, said second insulated pane of glass having a second insulated pane of glass size dimension which is larger than said second middle window opening size dimension and said second layer window opening size dimension; and an outer casing assembly, said outer casing assembly having an outer casing window opening, said outer casing window opening being aligned relative to said second layer window opening, wherein first fasteners engage said inner plate, said first layer of insulation and said first middle plate, wherein tightening said first fasteners squeezes said first insulated pane of glass between said middle casing assembly and said inner plate, and further wherein second fasteners extend inwardly from said outer casing assembly, said second fasteners engaging said outer casing assembly, said second layer of insulation and said second middle plate, wherein tightening of said second fasteners squeezes said second insulated pane of glass between said second layer of insulation and said second middle plate and further wherein said first fasteners may be released from said inner casing assembly, said first layer of insulation and said middle casing assembly, whereupon said outer casing assembly may be separated from said inner casing assembly.

2. The viewport according to claim 1, said middle casing assembly further comprising a middle top traverse plate, a middle bottom traverse plate, a middle left traverse plate and a middle right traverse plate, each of said middle top traverse plate, said middle bottom traverse plate, said middle left traverse plate, and said middle right traverse plate having an outside and an inside.

3. The viewport according to claim 2, said first middle plate comprising a first plate top wall, a first plate bottom wall, a first plate left wall and a first plate right wall, said first plate top wall extending perpendicularly upward from said outside of said middle top traverse plate, said first plate bottom wall extending perpendicularly downward from said outside of said middle bottom traverse plate, said first plate left wall extending perpendicularly outward from said outside of said middle left traverse plate, and said first plate right wall extending perpendicularly outward from said outside of said middle right traverse plate.

4. The viewport according to claim 3, said second middle plate comprising a second plate top wall, a second plate bottom wall, a second plate left wall and a second plate right wall, said second plate top wall extending perpendicularly upward from said outside of said middle top traverse plate, said second plate bottom wall extending perpendicularly downward from said outside of said middle bottom traverse plate, said second plate left wall extending perpendicularly outward from said outside of said middle left traverse plate and said second plate right wall extending perpendicularly outward from said outside of said middle right traverse plate.

5. The viewport according to claim 4, said middle top traverse plate having a top first middle positioning flange and a top second middle positioning flange, said top first middle positioning flange and said top second middle positioning flange extending inwardly from said inside of said middle top traverse plate.

6. The viewport according to claim 5, said middle bottom traverse plate having a bottom first middle positioning flange and a bottom second middle positioning flange, said bottom first middle positioning flange and said bottom second middle positioning flange extending inwardly from said inside of said middle bottom traverse plate.

7. The viewport according to claim 6, said middle left traverse plate having a left first middle positioning flange and a left second middle positioning flange, said left first middle positioning flange and said left second middle positioning flange extending inwardly from said inside of said middle left traverse plate.

8. The viewport according to claim 7, said middle right traverse plate having a right first middle positioning flange and a right second middle positioning flange, said right first middle positioning flange and said right second middle positioning flange extending inwardly from said inside of said middle right traverse plate.

9. The viewport according to claim 8, wherein said top first middle positioning flange is offset relative to said first plate top wall, and further wherein a third layer of insulation is disposed adjacent to said inside of said middle top traverse plate and proximate to said top first middle positioning flange.

10. The viewport according to claim 9, wherein said first insulated pane of glass has a first insulated pane of glass upper edge, said first insulated pane of glass upper edge being in contact with said third layer of insulation disposed adjacent to said inside of said middle top traverse plate and proximate to said top first middle positioning flange.

11. The viewport according to claim 10, wherein said bottom first middle positioning flange is offset relative to said first plate bottom wall, and further wherein said third layer of insulation is disposed adjacent to said inside of said middle bottom traverse plate proximate to said bottom first middle positioning flange.

12. The viewport according to claim 11, wherein said first insulated pane of glass has a first insulated pane of glass lower edge, said first insulated pane of glass lower edge is in contact with said third layer of insulation disposed adjacent to said inside of said middle bottom traverse plate and proximate to said bottom first middle positioning flange.

13. The viewport according to claim 12, wherein said left first middle positioning flange is offset relative to said first plate left wall, and further wherein said third layer of insulation is disposed adjacent to said inside of said middle left traverse plate and proximate to said left first middle positioning flange.

14. The viewport according to claim 13, wherein said first insulated pane of glass has a first insulated pane of glass left edge, said first insulated pane of glass left edge being in contact with said third layer of insulation disposed adjacent to said inside of said middle left traverse plate and proximate to said left first middle positioning flange.

15. The viewport according to claim 14, wherein said right first middle positioning flange is offset relative to said first plate right wall, and further wherein said third layer of insulation is disposed adjacent to said inside of said middle right traverse plate and proximate to said right first middle positioning flange.

16. The viewport according to claim 15, wherein said first insulated pane of glass has a first insulated pane of glass right edge, said first insulated pane of glass right edge being in contact with said third layer of insulation disposed adjacent to said inside of said middle right traverse plate and proximate to said right first middle positioning flange.

17. The viewport according to claim 16, wherein said top second middle positioning flange is offset relative to said second plate top wall, and further wherein a fourth layer of insulation is disposed adjacent to said inside of said middle top traverse plate and proximate to said top second middle positioning flange.

18. The viewport according to claim 17, wherein said second insulated pane of glass has a second insulated pane of glass upper edge, said second insulated pane of glass upper edge being in contact with said fourth layer of insulation disposed adjacent to said inside of said middle top traverse plate and proximate to said top second middle positioning flange.

19. The viewport according to claim 18, wherein said bottom second middle positioning flange is offset relative to said second plate bottom wall, and further wherein said fourth layer of insulation is disposed adjacent to said inside of said middle bottom traverse plate and proximate to said bottom second middle positioning flange.

20. The viewport according to claim 19, wherein said second insulated pane of glass has a second insulated pane of glass lower edge, said second insulated pane of glass lower edge being in contact with said fourth layer of insulation disposed adjacent to said inside of said middle bottom traverse plate and proximate to said bottom second middle positioning flange.

21. The viewport according to claim 20, wherein said left second middle positioning flange is offset relative to said second plate left wall, and further wherein said fourth layer of insulation is disposed adjacent to said inside of said middle left traverse plate and proximate to said left second middle positioning flange.

22. The viewport according to claim 21, wherein said second insulated pane of glass has a second insulated pane of glass left edge, said second insulated pane of glass left edge being in contact with said fourth layer of insulation disposed adjacent to said inside of said middle left traverse plate and proximate to said left second middle positioning flange.

23. The viewport according to claim 22, wherein said right second middle positioning flange is offset relative to said second plate right wall and further wherein said fourth layer of insulation is disposed adjacent to said inside of said middle right traverse plate and proximate to said right second middle positioning flange.

24. The viewport according to claim 23, wherein said second insulated pane of glass has a second insulated pane of glass right edge, said second insulated pane of glass right edge being in contact with said fourth layer of insulation disposed adjacent to said inside of said middle right traverse plate and proximate to said right second middle positioning flange.

* * * * *